US009148556B2

(12) United States Patent
Oh

(10) Patent No.: US 9,148,556 B2
(45) Date of Patent: Sep. 29, 2015

(54) CAMERA MODULE CONFIGURED TO PREVENT INTRODUCTION OF FOREIGN OBJECTS AND TO PREVENT IRREGULARLY REFLECTED LIGHT FROM BEING INTRODUCED TO IMAGE SENSOR

(71) Applicant: SAMSUNG ELECTRO-MECHANICS CO., LTD., Suwon (KR)

(72) Inventor: Seung Man Oh, Suwon (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 78 days.

(21) Appl. No.: 13/961,376

(22) Filed: Aug. 7, 2013

(65) Prior Publication Data

US 2014/0354824 A1 Dec. 4, 2014

(30) Foreign Application Priority Data

May 29, 2013 (KR) ........................ 10-2013-0060840

(51) Int. Cl.
*H04N 5/225* (2006.01)

(52) U.S. Cl.
CPC ........... *H04N 5/2257* (2013.01); *H04N 5/2254* (2013.01)

(58) Field of Classification Search
USPC .................... 348/374; 250/239; 257/432–434
See application file for complete search history.

(56) References Cited

U.S. PATENT DOCUMENTS 7,920,206 B2 * 4/2011 Moon et al. .................... 348/374
8,553,343 B2 * 10/2013 Fujinaka et al. .............. 359/892
2006/0215055 A1 * 9/2006 Yoon ............................ 348/342
2008/0297645 A1 * 12/2008 Lo et al. ........................ 348/340

FOREIGN PATENT DOCUMENTS

JP 2006-267692 A 10/2006
JP 2008-205723 * 9/2008 ............. H04N 5/225
KR 10-2007-0071376 A 7/2007
KR 10-2008-0079086 A 8/2008
KR 10-0856572 9/2008
KR 10-2010-0081469 A 7/2010
KR 10-2013-0008770 1/2013
KR 1020130008770 * 1/2013 ............. H04N 5/225

OTHER PUBLICATIONS

Office Action dated Sep. 11, 2014 for Korean Patent Application No. 10-2013-0060840 and its English summary provided by Applicant's foreign counsel.
Korean Office Action issued Jul. 24, 2015 in counterpart Korean Application No. KR 10-2013-0060840 (10 pages, in Korean, with English language translation).

* cited by examiner

*Primary Examiner* — Ngoc-Yen Vu
(74) *Attorney, Agent, or Firm* — NSIP Law

(57) ABSTRACT

There is provided a camera module including: a lens barrel including at least one lens disposed along an optical axis; a housing in which the lens barrel is disposed; and an infra-red (IR) filter adhesively bonded to an inner surface of the housing and disposed below the lens barrel, wherein protective tape is adhered to a contact surface of the IR filter in contact with the inner surface of the housing.

8 Claims, 4 Drawing Sheets

10 41 50 40 53 61 60

10 41 50 40 57 61 60

CAMERA MODULE CONFIGURED TO PREVENT INTRODUCTION OF FOREIGN OBJECTS AND TO PREVENT IRREGULARLY REFLECTED LIGHT FROM BEING INTRODUCED TO IMAGE SENSOR

CROSS-REFERENCE TO RELATED APPLICATIONS

This application claims the priority of Korean Patent Application No. 10-2013-0060840 filed on May 29, 2013, in the Korean Intellectual Property Office, the disclosure of which is incorporated herein by reference in its entirety.

BACKGROUND OF THE INVENTION

1. Field of the Invention

The present invention relates to a camera module.

2. Description of the Related Art

Recently, it is becoming common to transmit image data in addition to text or voice data with a general portable communications terminal such as a mobile phone, a personal digital assistant (PDA), a portable computer, or the like.

Therefore, in order to perform image data transmission, or the like, camera modules have come to be installed in portable communications terminals as basic elements thereof.

An infra-red (IR) filter may be used in this camera module.

Since the camera module is able to recognize a wider range of wavelengths of light than the human eye, the camera module may recognize light within the infra red (IR) range that cannot be registered by the human eye as light.

Therefore, in the case in which the camera module outputs image information containing light as it is recognized by the camera module, since images having different colors from those actually seen by the human eye may be output, there is a need to filter IR light using an IR filter.

In this case, when the IR filter is fixed to a housing of the camera module, light, having passed through a lens may be irregularly reflected by an inner wall of the housing, or the like, to thereby be introduced to an image sensor.

In this case, a flare phenomenon such as light spreading, or the like, may be generated, which may have a negative influence on image quality. Therefore, there is a need to prevent light, irregularly reflected in the camera module, from being introduced to the image sensor.

Further, a fine cracking phenomenon may be generated in a cutting plane of the IR filter during a process of manufacturing the IR filter. In this case, foreign objects may be generated, to thereby be introduced in the camera module.

SUMMARY OF THE INVENTION

An aspect of the present invention is to provide a camera module capable of preventing foreign objects from being introduced to the camera module even in the case that a fine cracking phenomenon is generated in a process of cutting an IR filter and capable of preventing irregularly reflected light from being introduced to an image sensor, even in the case that light having passed through a lens is irregularly reflected in the camera module.

According to an aspect of the present invention, there is provided a camera module including: a lens barrel including at least one lens disposed along an optical axis; a housing in which the lens barrel is disposed; and an infra-red (IR) filter adhesively bonded to an inner surface of the housing and disposed below the lens barrel, wherein protective tape is adhered to a contact surface of the IR filter in contact with the inner surface of the housing.

The inner surface of the housing may be provided with a protrusion part protruding inwardly in a horizontal direction, and the IR filter may be adhered to the protrusion part.

The protective tape may be adhered to the contact surface of the IR filter and a portion of a lower surface of the IR filter.

The protective tape may be adhered along an edge of the lower surface of the IR filter.

The protective tape may be continuously adhered to the contact surface of the IR filter and a lower surface of the IR filter adjacent to the contact surface.

The protective tape adhered to the lower surface of the IR filter may be formed so as to protrude further inwardly in the horizontal direction than the protrusion part.

The IR filter may be adhered to the housing via a UV adhesive.

The protective film may be adhered so as to entirely enclose an outer side end of the IR filter.

According to another aspect of the present invention, there is provided a camera module including: a lens barrel including at least one lens disposed along an optical axis; a housing in which the lens barrel is disposed; and an infra-red (IR) filter adhesively bonded to an inner surface of the housing and disposed below the lens barrel, wherein protective tape is adhered to a side surface of the IR filter.

The protective tape may be continuously adhered to the side surface of the IR filter and a portion of a lower surface of the IR filter adjacent to the side surface.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
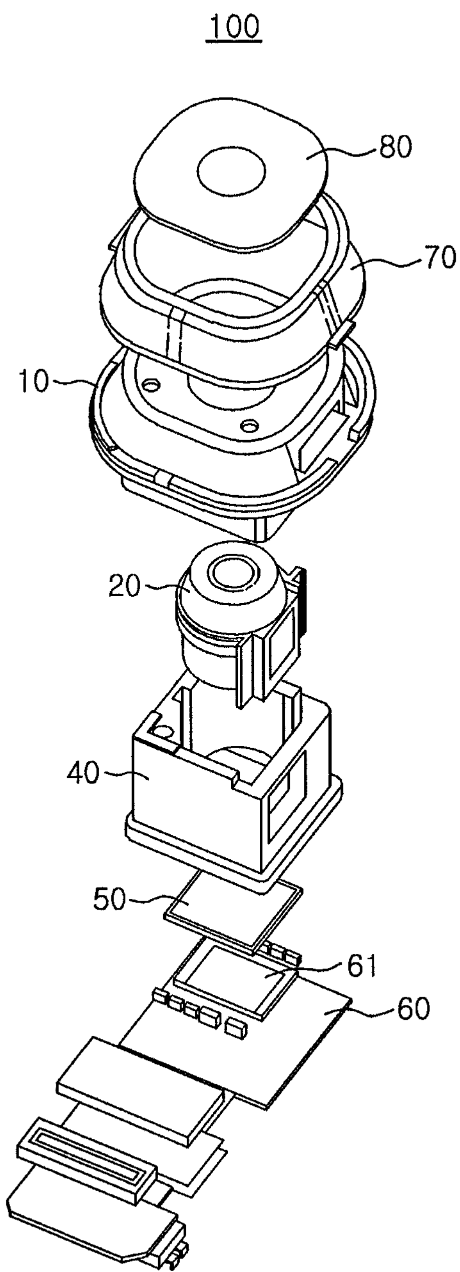
FIG. 1 is an exploded perspective view of a camera module according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

Further, like reference numerals will be used to designate like components having similar functions throughout the drawings within the scope of the present invention.

FIG. 1 is an exploded perspective view of a camera module according to an embodiment of the present invention.

Referring to FIG. 1, the camera module according to the embodiment of the present invention may include a lens barrel 20, a housing 40, a case 10, an actuator 30, an infra-red (IR) filter 50, an image sensor 61, and a printed circuit board 60.

First, terms with respect to directions will be defined. An optical axis direction refers to a vertical direction based on the lens barrel 20, and a horizontal direction refers to a direction perpendicular to the optical axis direction.

The lens barrel 20 may have a hollow cylindrical shape so that at least one lens for photographing a subject may be received therein, and the lens may be provided in the lens barrel 20 along the optical axis.

The lens barrel 20 may be coupled to the housing 40. In detail, the lens barrel 20 may be disposed in the housing 40.

Here, the lens barrel 20 may move in the optical axis direction for auto-focusing.

In order to move the lens barrel 20 in the optical axis direction, the actuator 30 including a voice coil motor may be provided in the housing 40.

The actuator 30 may include a coil 33, a magnet 31, and a yoke (not shown), wherein the coil 33 may move the lens barrel 20 in the optical axis direction by attractive force and repulsive force exerted by the magnet 31 adjacent thereto.

The magnet 31 may form a magnetic field having a predetermined strength, and when power is applied to the coil 33, driving force generated by electromagnetic influence between the magnet 31 and the coil 33 is generated, such that the lens barrel 20 may be moved in the optical direction by the driving force.

However, a moving unit of the lens barrel 20 is not limited to the actuator 30 including the voice coil motor (VCM), and various methods such as a mechanical driving method, a piezoelectric driving method using a piezoelectric material, or the like, may be used.

The lens barrel 20 is moved by the operation as described above, such that an auto-focusing operation or a zoom operation may be performed.

Meanwhile, a central portion of the coil 33 may be provided with a position sensor 35.

The position sensor 35 may sense a current position of the lens barrel 20 to provide current positional information of the lens barrel 20 to a control part (not shown), and the control part (not shown) may control movement of the lens barrel 20 using the current positional information of the lens barrel 20 received from the position sensor 35 and positional information of a destination to which the lens barrel 20 should be moved.

Since the position sensor 35 is positioned in the central position of the coil 33, a separate space for disposing the position sensor 35 in the housing 40 is not required, such that the actuator may be miniaturized, and a manufacturing tolerance during a manufacturing process may be decreased.

The case 10 may be coupled to the housing 40 so as to enclose an outer surface of the housing 40.

Here, a conductive paint (not shown) may be applied to at least one of an inner surface of the case 10 and the outer surface of the housing 40, and electromagnetic radiation generated at the time of driving the camera module may be shielded by the conductive paint (not shown).

That is, the electromagnetic radiation is generated at the time of driving the camera module, and in the case that the electromagnetic radiation as described above is emitted to the outside, the electromagnetic radiation may affect other electronic components, which may generate a communication error or malfunction.

Therefore, in order to block the electromagnetic radiation from being emitted to the outside, the conductive paint (not shown) may be applied to at least one of the inner surfaces of the case 10 and the outer surface of the housing 40.

In addition, since an influence of electromagnetic radiation generated by an external element on the image sensor 61 may be prevented, various types of noise may be blocked.

As the conductive paint (not shown), conductive epoxy may be used, but the present invention is not limited thereto. That is, various materials having conductivity may be used, and a conductive film or tape may be attached to at least one of the inner surface of the case 10 and the outer surface of the housing 40.

An upper portion of the case 10 may have a cylindrical shape, and a lower portion of the case 10 may have a rectangular parallelepiped shape, but the case 10 is not limited thereto. That is, the shape of the case 10 may be variously changed depending on shapes of the housing 40 and a mobile communications device in which the camera module is mounted.

The upper portion of the case 10 may be formed with a through-hole so that external light may be incident through the lens barrel 20, and the external light incident through the through-hole may be received in the image sensor 61 through the lens.

Here, the upper portion of the case 10 may be mounted with a window 80 so as to cover the through-hole for protection of the lens.

In order to stably mount the window 80, the upper portion of the case 10 may be provided with a step part.

In addition, a cover part 70 may be coupled to the case 10 so as to cover the upper portion of the case 10.

Since the upper portion of the case 10 may be closed from the outside by the cover part 70, an introduction of external foreign objects to the camera module according to the embodiment of the present invention may be prevented.

The image sensor 61 such as a charge coupled device (CCD) or a complementary metal oxide semiconductor (CMOS) may be mounted on the printed circuit board 60 through wire bonding, and the printed circuit board 60 may be coupled to a lower portion of the housing 40.

An image of the subject may be collected in the image sensor 61 to thereby be stored in a memory in a device as data, and the stored data may be displayed as the image through a display medium in the device.

Here, the IR filter 50 may be disposed between the lens barrel 20 and the image sensor 61.

That is, the IR filter 50 may be disposed below the lens barrel 20.

IR light in the light having passed through the lens may be blocked while passing through the IR filter 50, thereby preventing the IR light from being introduced to the image sensor 61.

Figure 2:
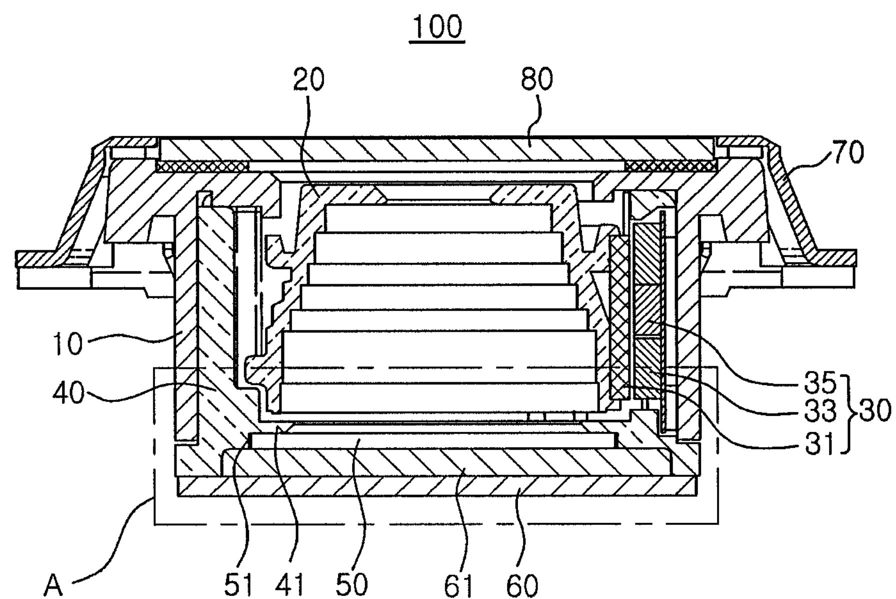
FIG. 2 is a cross-sectional view of the camera module according to the embodiment of the present invention.
Figure 3:
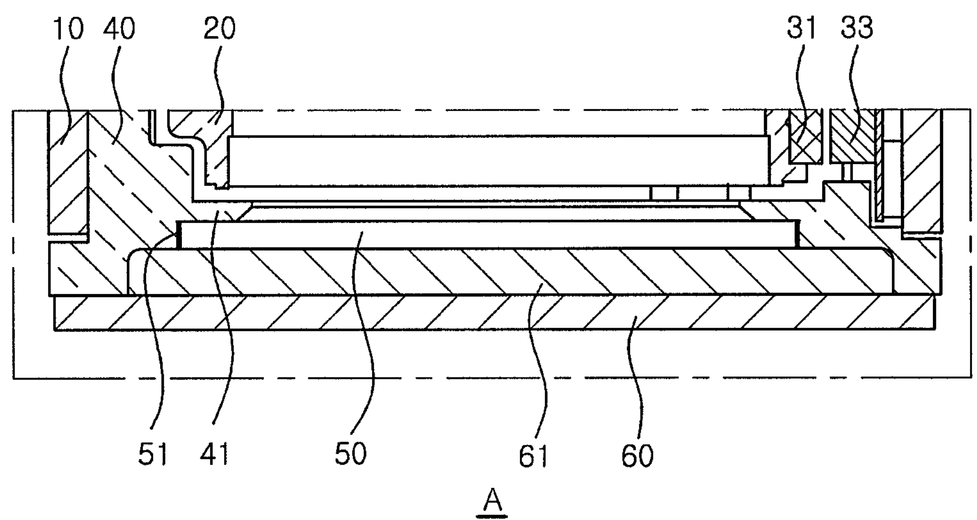
FIG. 3 is an enlarged cross-sectional view of part A of FIG. 2.

FIG. 2 is a cross-sectional view of the camera module according to the embodiment of the present invention, and FIG. 3 is an enlarged cross-sectional view of part A of FIG. 2.

Referring to FIGS. 2 and 3, the IR filter 50 provided in the camera module according to the present invention may be adhesively bonded to the inner surface of the housing 40. That is, the IR filter 50 and the housing 40 may be adhered to each other via a UV adhesive (not shown).

In detail, the inner surface of the housing 40 may be provided with a protrusion part 41 protruding inwardly in the horizontal direction, and the IR filter 50 may be adhered to the protrusion part 41.

An upper surface of an outer side end of the IR filter 50 may be adhered to a lower surface of the protrusion part 41 via the UV adhesive (not shown), and a side surface of the IR filter 50 may be in contact with the inner surface of the housing 40.

Here, protective tape 51 may be adhered to a contact surface of the IR filter 50 (the side surface of the IR filter 50) in contact with the inner surface of the housing 40.

The IR filter 50 may be formed of a glass material and manufactured by depositing various materials having different refractive indices in order to block light in an IR light region.

The IR filter 50 is subjected to a cutting process so as to have a pre-designed size during a manufacturing process of the IR filter 50. At this time, a fine cracking phenomenon may be generated in a cutting surface of a cut piece of glass.

Foreign objects may be introduced to the camera module due to the cracking phenomenon as described above, which has a negative influence on the quality of the camera module such as operational errors, or the like.

However, since the IR filter 50 provided in the camera module according to the present invention may include the protective tape adhered thereto, even in the case that the fine cracking phenomenon is generated in the cutting surface of the IR filter 50, a generation of foreign objects may be suppressed by the protective tape.

That is, even in the case that the cracking phenomenon is generated in the cutting surface of the IR filter 50 in the cutting process of the IR filter 50, since the protective tape 51 may adhered to the cutting surface of the IR filter 50, the generation of foreign objects may be suppressed.

In addition, a color of the protective tape 51 may be black. In this case, even in the case that light having passed through the lens arrives at an inner wall of the housing 50, the light may be absorbed by the protective tape 51, such that irregularly reflected light may not be allowed to arrive at the image sensor 61.

Therefore, generation of a flare phenomenon may be suppressed.

Figure 4:
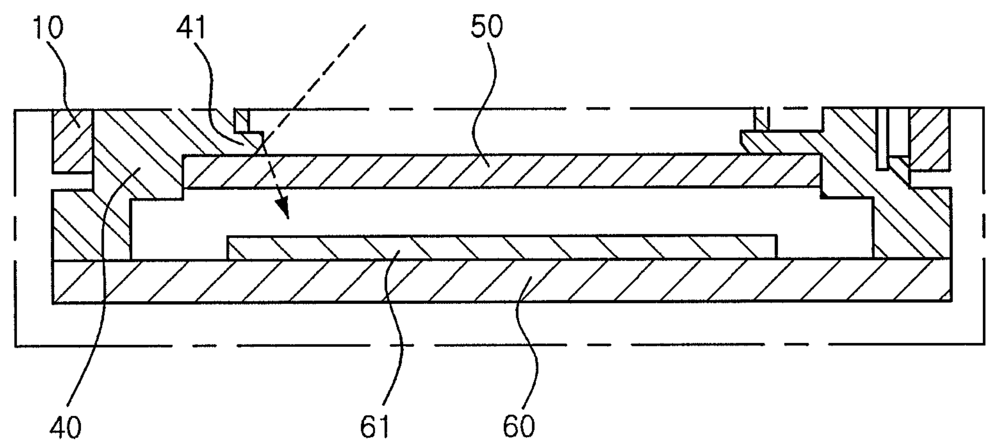
FIG. 4 is a schematic cross-sectional view showing a form in which light is irregularly reflected into an image sensor in the camera module.
Figure 5:
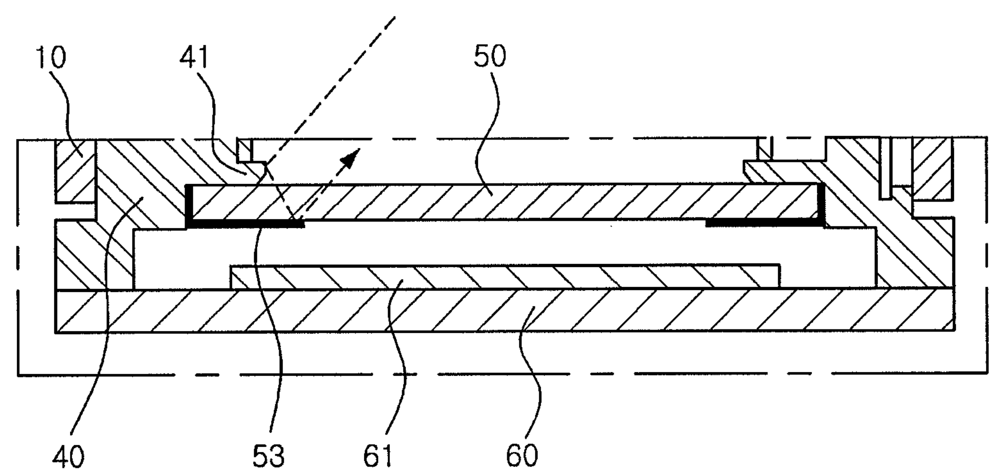
FIG. 5 is a schematic cross-sectional view showing a form in which irregularly reflected light is blocked in a camera module according to another embodiment of the present invention.

FIG. 4 is a schematic cross-sectional view showing a form in which light is irregularly reflected into an image sensor in the camera module, and FIG. 5 is a schematic cross-sectional view showing a form in which irregularly reflected light is blocked in a camera module according to another embodiment of the present invention.

Figure 6:
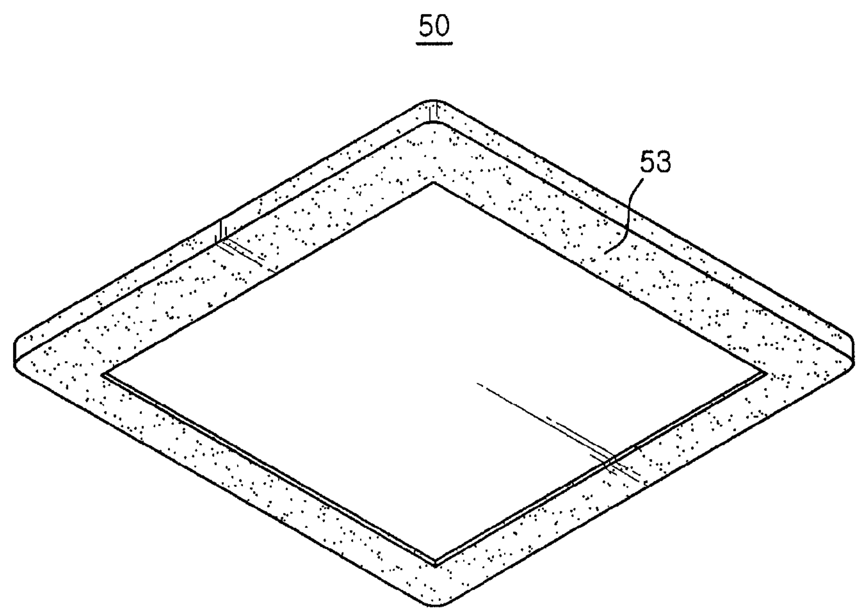
FIG. 6 is a perspective view of an IR filter provided in the camera module according to another embodiment of the present invention.
Figure 7:
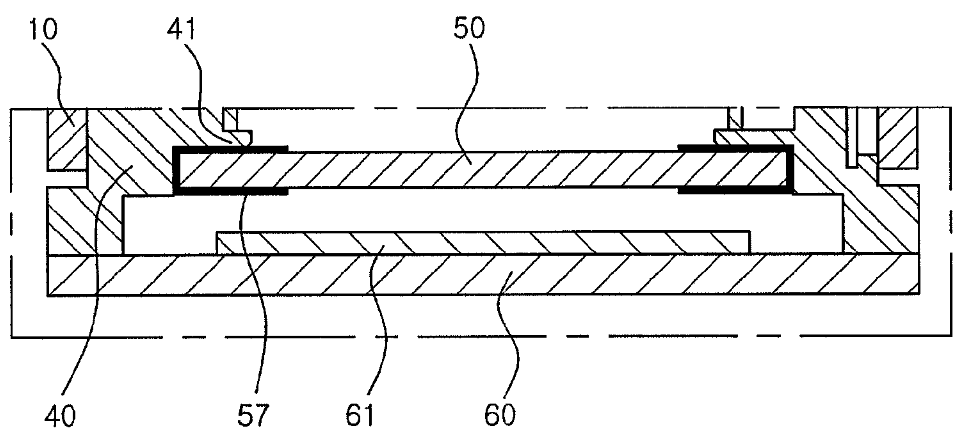
FIG. 7 is a partial cross-sectional view showing a camera module according to another embodiment of the present invention.

In addition, FIG. 6 is a perspective view of an IR filter provided in the camera module according to another embodiment of the present invention, and FIG. 7 is a partial cross-sectional view showing a camera module according to another embodiment of the present invention.

First, a process of blocking the irregularly reflected light in the camera module according to the embodiment of the present invention will be described with reference to FIGS. 4 and 5.

The light incident to the camera module passes through the lens provided in the lens barrel and the IR filter to be collected on the image sensor 61.

In addition, the light collected on the image sensor 61 may be converted into an electric signal to configure an image.

Here, as shown in FIG. 4, the light having passed through the lens may be reflected by the inner wall of the housing 40, or the like, and the light irregularly reflected as described above may arrive at the image sensor 61.

In the case in which light is reflected or scattered in an optical apparatus, the reflected or scattered light may be overlapped with an image of the subject to be observed, such that image quality may be deteriorated.

That is, since the light irregularly reflected to arrive at the image sensor 61 may generate the flare phenomenon such as light spreading, the irregularly reflected light may have a negative influence on image quality.

Therefore, in the camera module according to another embodiment of the present invention, protective tape 53 may be adhered to a lower surface of an IR filter 50 so that the irregularly reflected light may be blocked.

As shown in FIG. 5, the protective tape 53 may be adhered to a contact surface of the IR filter 50 and a portion of the lower surface of the IR filter 50 and adhered along an edge of the lower surface of the IR filter 50.

That is, the protective tape 53 may be continuously adhered to the contact surface of the IR filter 50 and the lower surface of the IR filter 50 adjacent to the contact surface.

Meanwhile, as shown in FIG. 7, protective tape 57 may be adhered to a contact surface of an IR filter 50 and an upper surface of the IR filter 50 adjacent to the contact surface. In this case, the protective tape 57 may be adhered to all of the contact surface of the IR filter 50 and upper and lower surfaces of the IR filter 50 adjacent to the contact surface.

Therefore, the protective tape 57 may be adhered to entirely enclose an outer side end of the IR filter 50.

In addition, the protective tape 53 or 57 may be formed of a material capable of reflecting light.

Therefore, even in the case that light having passed through the lens is reflected by the inner wall of the housing 40, or the like, since the reflected light may be reflected again by the protective tape 53 or 57, thereby blocking the irregularly reflected light from being introduced to the image sensor 61.

An inner surface of a housing 40 may be provided with a protrusion part 41 protruding inwardly in the horizontal direction and the IR filter 50 may be adhered to the protrusion part 41.

Here, the protective tape 53 adhered to the lower surface of the IR filter 50 may be formed so as to protrude further inwardly in the horizontal direction than the protrusion part.

In the case in which the protective tape 57 is also adhered to the upper surface of the IR filter 50 as shown in FIG. 7, at least one of the pieces of protective tape 57 adhered to the upper and lower surfaces of the IR filter 50 may be formed so as to protrude further inwardly in the horizontal direction than the protrusion part.

A length of the pieces of protective tape 53 or 57 adhered to the lower surface of the IR filter 50 may be appropriately determined in consideration of the light reflected by the inner wall of the housing 40, or the like.

Therefore, in the camera modules according to another embodiments of the present invention, introduction of the light irregularly reflected by the inner wall of the housing 40 in the image sensor may be blocked by adhering the pieces of protective tape 53 or 57 to the lower surface (or upper and lower surfaces) of the IR filter 50.

As set forth above, in the camera module according to the present invention, even in the case that the fine cracking phenomenon is generated in the cutting process of the IR filter, the introduction of foreign objects to the camera module may be prevented, and even in the case that the light having passed through the lens is irregularly reflected in the camera module, introduction of the irregularly reflected light in the image sensor may be prevented.

While the present invention has been shown and described in connection with the embodiments, it will be apparent to those skilled in the art that modifications and variations can be made without departing from the spirit and scope of the invention as defined by the appended claims.

What is claimed is:

1. A camera module comprising:

a lens barrel including at least one lens disposed along an optical axis;

a housing in which the lens barrel is disposed; and an infra-red (IR) filter adhesively bonded to an inner surface of the housing and disposed below the lens barrel, wherein protective tape is adhered to a contact surface of the IR filter in contact with the inner surface of the housing and a portion of a remaining surface, except for the contact surface of the IR filter.

2. The camera module of claim 1, wherein the inner surface of the housing is provided with a protrusion part protruding inwardly in a horizontal direction, and the IR filter is adhered to the protrusion part.

3. The camera module of claim 2, wherein the protective tape is continuously adhered to the contact surface of the IR filter and a lower surface of the IR filter adjacent to the contact surface.

4. The camera module of claim 1, wherein the protective tape is adhered to the contact surface of the IR filter and a portion of a lower surface of the IR filter.

5. The camera module of claim 4, wherein the protective tape is adhered along an edge of the lower surface of the IR filter.

6. The camera module of claim 1, wherein the IR filter is adhered to the housing via a UV adhesive.

7. The camera module of claim 1, wherein the protective film is adhered so as to entirely enclose an outer side end of the IR filter.

8. A camera module, comprising:

a lens barrel including at least one lens disposed along an optical axis;

a housing in which the lens barrel is disposed; and an infra-red (IR) filter adhesively bonded to an inner surface of the housing and disposed below the lens barrel, wherein protective tape is adhered to a contact surface of the IR filter in contact with the inner surface of the housing, wherein the inner surface of the housing is provided with a protrusion part protruding inwardly in a horizontal direction, and the IR filter is adhered to the protrusion part, wherein the protective tape is continuously adhered to the contact surface of the IR filter and a lower surface of the IR filter adjacent to the contact surface, and wherein the protective tape adhered to the lower surface of the IR filter is formed so as to protrude further inwardly in the horizontal direction than the protrusion part.

* * * * *